(12) United States Patent
Kolbet et al.

(10) Patent No.: US 7,673,826 B2
(45) Date of Patent: *Mar. 9, 2010

(54) MOBILE SHREDDER

(75) Inventors: Gary Lee Kolbet, High Point, NC (US); Mel Todd Carswell, Lexington, NC (US); William Len Beusse, Trinity, NC (US); Henry Marshall Kennedy, High Point, NC (US)

(73) Assignee: Vecoplan, LLC, Archdale, NC (US)

( * ) Notice: Subject to any disclaimer, the term of this patent is extended or adjusted under 35 U.S.C. 154(b) by 475 days.

This patent is subject to a terminal disclaimer.

(21) Appl. No.: 11/685,925

(22) Filed: Mar. 14, 2007

(65) Prior Publication Data

US 2007/0152088 A1 Jul. 5, 2007

Related U.S. Application Data

(63) Continuation of application No. 10/918,249, filed on Aug. 13, 2004, now Pat. No. 7,198,213.

(51) Int. Cl.
*A01D 34/00* (2006.01)
*B02B 5/02* (2006.01)
*B02C 9/04* (2006.01)
*B02C 19/00* (2006.01)
*B03B 7/00* (2006.01)

(52) U.S. Cl. .................. 241/101.741; 241/101.742

(58) Field of Classification Search ............ 241/101.74, 241/101.741, 101.742; 414/408, 502, 525.9, 414/526, 541, 540; 198/750.2, 750.7, 750.8, 198/750.3
See application file for complete search history.

(56) References Cited

U.S. PATENT DOCUMENTS 1,224,960 A 5/1917 Saecker
2,828,082 A 3/1958 Vander Veen
2,961,977 A 11/1960 Coleman
2,973,856 A * 3/1961 Brooks ................ 198/776
3,189,286 A 6/1965 O'Connor
3,534,875 A * 10/1970 Hallstrom Jr. ............ 414/525.9
4,018,392 A 4/1977 Wagner
4,134,554 A 1/1979 Morlock
4,205,799 A 6/1980 Brewer
4,227,849 A 10/1980 Worthington
4,640,659 A 2/1987 Parks
4,645,018 A 2/1987 Garbade et al.

(Continued)

FOREIGN PATENT DOCUMENTS

EP           1 048 352 A1    11/2000
WO         WO 01/70406 A2    9/2001

*Primary Examiner*—Bena Miller
(74) *Attorney, Agent, or Firm*—Alston & Bird LLP

(57) ABSTRACT

A mobile shredder comprises a truck having a truck body defining an enclosure and including a partition in the enclosure that divides a storage volume from the remainder of the enclosure for storage of shredded material in the storage volume, a single-shaft rotary shredder mounted in the enclosure outside the storage volume, the rotary shredder comprising a rotor having cutters rigidly mounted thereon, a bin lift and dump mechanism operable to transport material to be shredded from outside to inside the enclosure so as to deliver material to the rotary shredder, and a discharge conveyor operable to transport shredded material from the rotary shredder through the partition to the storage volume. The floor of the storage volume can comprise a walking floor, and the enclosure can have rear doors that are openable to allow shredded material to be discharged through the open rear doors when the walking floor is operated.

15 Claims, 14 Drawing Sheets

U.S. PATENT DOCUMENTS

| | | | |
|---|---|---|---|
| 4,960,088 A | 10/1990 | Havemann et al. | |
| 4,961,539 A * | 10/1990 | Deem | 241/36 |
| 5,025,992 A * | 6/1991 | Niebur | 241/101.76 |
| 5,186,397 A | 2/1993 | Orlando | |
| 5,197,682 A | 3/1993 | Del Zotto | |
| 5,226,757 A | 7/1993 | Tarrant | |
| 5,261,614 A | 11/1993 | Schwelling | |
| 5,340,264 A * | 8/1994 | Quaeck | 414/525.9 |
| 5,375,782 A | 12/1994 | Schwelling | |
| 5,383,548 A * | 1/1995 | Quaeck | 198/750.6 |
| 5,542,617 A | 8/1996 | Rajewski | |
| 5,573,190 A * | 11/1996 | Goossen | 241/27 |
| 5,676,320 A | 10/1997 | Merklinger | |
| 5,720,438 A | 2/1998 | Devine et al. | |
| 5,839,568 A * | 11/1998 | Clark | 198/750.5 |
| 5,871,162 A | 2/1999 | Rajewski | |
| 5,873,304 A | 2/1999 | Ruf | |
| 5,927,626 A | 7/1999 | Shinjo et al. | |
| 5,938,132 A | 8/1999 | Shinjo et al. | |
| 5,979,804 A | 11/1999 | Abrams et al. | |
| 6,080,081 A | 6/2000 | Sauermann et al. | |
| 6,332,582 B1 | 12/2001 | Ikegami et al. | |
| 6,491,245 B1 | 12/2002 | Rajewski | |
| 6,588,691 B2 | 7/2003 | Yamamoto et al. | |
| 6,928,358 B2 | 8/2005 | Brooks et al. | |
| 7,316,307 B2 * | 1/2008 | Foster et al. | 198/750.2 |
| 2002/0017577 A1 | 2/2002 | Rajewski | |
| 2003/0042343 A1 | 3/2003 | Yamamoto et al. | |
| 2003/0061926 A1 | 4/2003 | Sotsky | |
| 2005/0173570 A1 | 8/2005 | Tanaka et al. | |
| 2005/0177288 A1 | 8/2005 | Sullivan et al. | |
| 2006/0111851 A1 | 5/2006 | Potgieter et al. | |

* cited by examiner

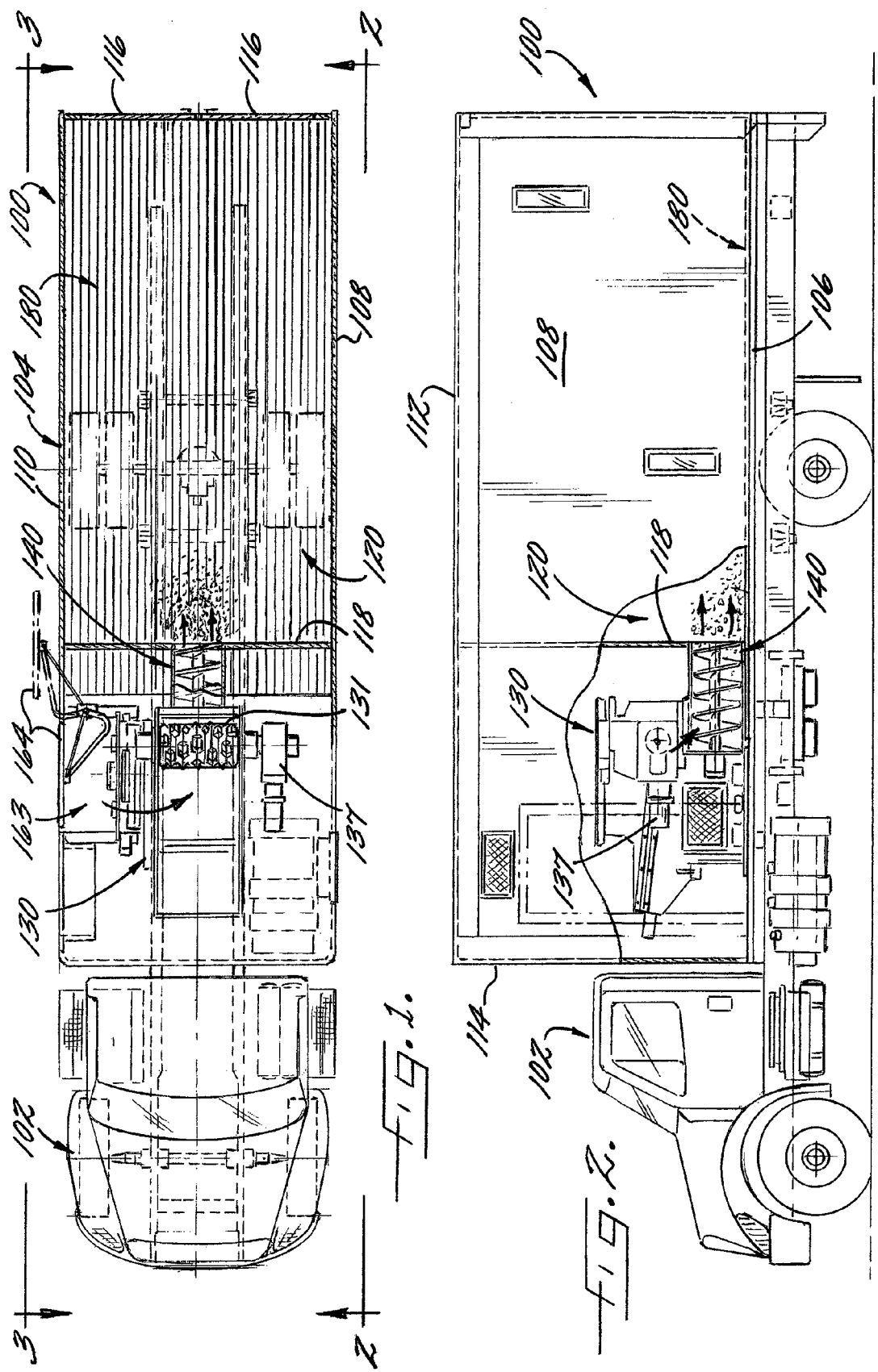

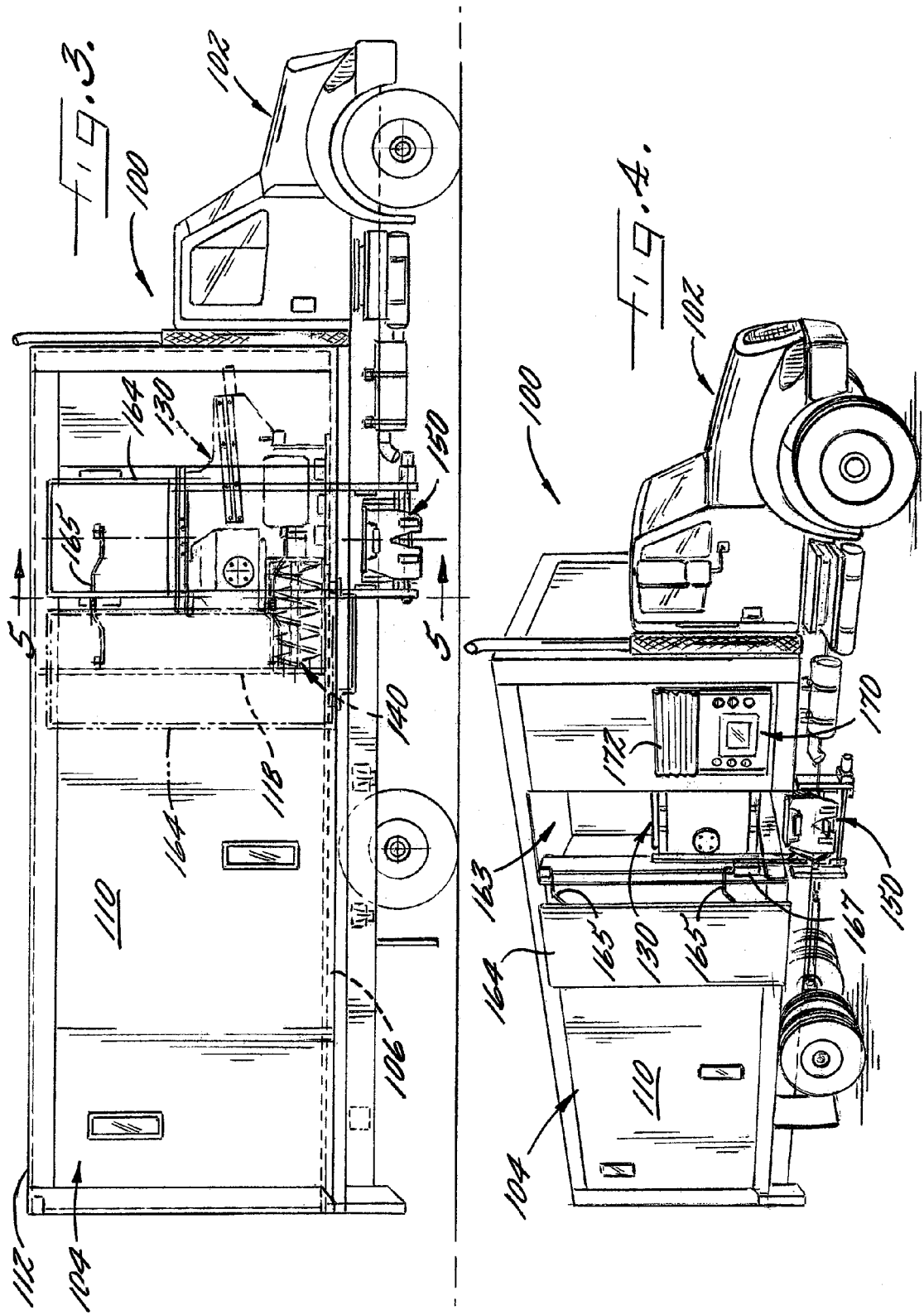

INPUTS

| | | |
|---|---|---|
| ○○ PTO Switch | ○○ Loader Middle LS | ○○ Ram Front Position |
| ○○ Controls Door Switch | ○○ Loader Up LS | ○○ Ram Rear Position |
| ○○ Parking Brake | ○○ System Start PB | ○○ E-Stop (Relay Panel) | ○○ Reserved |
| ○○ General Truck Alarm | ○○ System Stop PB | ○○ Smoke Detector | ○○ Reserved |
| ○○ Low Fuel | ○○ Shredder Start PB | ○○ Shredder Door Switch | ○○ Reserved |
| ○○ Low Engine RPM | ○○ Shredder Stop PB | ○○ Hopper Door LS | ○○ Reserved |
| ○○ Work Light Switch | ○○ Loader Up PB | ○○ Shredder Torque Switch | ○○ Reserved |
| ○○ Neutral Switch | ○○ Loader Down PB | ○○ Auger Proximity Switch | ○○ Reserved |
| ○○ Ctls Door Open LS | ○○ Discharge Start PB | ○○ Hyd Pressure - Ram | ○○ Reserved |
| ○○ Ctls Door Closed LS | ○○ Discharge Stop PB | ○○ Hyd Pressure - Loader | ○○ Reserved |
| ○○ Toter Door Closed LS | ○○ Reset PB | ○○ Hyd Pressure - Filter | ○○ Reserved |
| ○○ Loader Down LS | ○○ E-Stop (IPC panel) | ○○ Hyd Oil Level - Low | [Main Screen] |
| | | ○○ Hyd Oil Level - Danger Low | |

OUTPUTS

| | | |
|---|---|---|
| ○○ PTO Air Solenoid | ○○ Loader Up | ○○ Toter Door Open | ○○ High Alarm |
| ○○ Rotor Forward | ○○ Loader Down | ○○ Oil Cooler | ○○ Fan |
| ○○ Rotor Reverse | ○○ Air Outlet | ○○ Oil Heater | ○○ Reserved |
| ○○ Ram Forward | ○○ Camera Lights | ○○ IPC / Printer | ○○ Reserved |
| ○○ Ram Reverse | ○○ Work Lights | ○○ Camera Air Purge | ○○ Reserved |
| ○○ Auger | ○○ Controls Door Open | ○○ Low Alarm | ○○ Reserved |
| ○○ Walking Floor | ○○ Controls Door Close | ○○ Medium Alarm | ○○ Reserved |

| Sort | | Sort | Sort | | Autumn Song Photography |
|---|---|---|---|---|---|
| | 0 | | All Customers | | Bills Pizza |
| | | | | | Bryan Hebert's Ju-Jitsu |
| | | | | | CES Electrical |
| | | | | | Duct Incorporated |
| | | | | | High Point Photo |
| | | | | | Marc Parsons Nature Photogr. |
| 3/8/2004 at 5:00:13 PM | PTO Switch Not Engaged | ALARM | 0 | | Marsh Cabinets |
| 3/8/2004 at 4:44:54 PM | PTO Switch Not Engaged | ALARM | 0 | | Marty Kennedy |
| 3/8/2004 at 4:44:41 PM | PTO Switch Not Engaged | ALARM | 0 | | New Customer |
| 3/8/2004 at 4:43:50 PM | PTO Switch Not Engaged | ALARM | 0 | | Parsons PhotoGraphics |
| 3/8/2004 at 3:51:24 PM | PTO Switch Not Engaged | ALARM | 0 | | Ponzoni Photographic |
| 3/8/2004 at 3:36:42 PM | PTO Switch Not Engaged | ALARM | 0 | | Test Cust 3 |
| 3/8/2004 at 3:36:41 PM | PTO Switch Not Engaged | ALARM | 0 | | Test Customer |
| 3/8/2004 at 3:36:24 PM | PTO Switch Not Engaged | ALARM | 0 | | Test Customer 2 |
| 3/8/2004 at 3:36:14 PM | PTO Switch Not Engaged | ALARM | 0 | | Test Duplicate 1 |
| 3/8/2004 at 3:25:35 PM | PTO Switch Not Engaged | ALARM | 0 | | Test Duplicate 2 |
| 3/8/2004 at 3:25:32 PM | PTO Switch Not Engaged | No | 0 | | The James Group |
| 3/8/2004 at 3:22:11 PM | Cutter Hours Reset | ALARM | 0 | | Todd Carswell |
| 3/26/2004 at 8:55:23 AM | Analog Processor Error - System | ALARM | 0 | | Vecoplan, LLC |
| 3/26/2004 at 8:55:22 AM | Analog Processor Error - System | ALARM | 0 | | |
| 3/26/2004 at 8:55:21 AM | Analog Processor Error - System | ALARM | 0 | | |
| 3/26/2004 at 8:55:20 AM | Analog Processor Error - System | ALARM | 0 | | 3 |
| 3/26/2004 at 8:55:18 AM | Analog Processor Error - System | ALARM | 0 | | |
| 3/26/2004 at 8:55:17 AM | Analog Processor Error - System | ALARM | 0 | | Autumn Song Photography |
| 3/26/2004 at 8:55:16 AM | Analog Processor Error - System | ALARM | 0 | | |
| 3/26/2004 at 8:55:12 AM | Analog Processor Error - System | ALARM | 0 | | Previous Page |
| 2/12/2004 at 8:17:20 PM | Cutter Hours Reset | No | 0 | | |
| 2/12/2004 at 8:17:18 PM | Cutter Hours Reset | No | 0 | | Next Page |
| 2/12/2004 at 8:17:17 PM | Cutter Hours Reset | No | 0 | | |
| 2/12/2004 at 8:17:15 PM | Cutter Hours Reset | No | 0 | | Print History |
| 2/12/2004 at 8:17:13 PM | Cutter Hours Reset | No | 0 | | |
| 4/7/2004 | | 1/16/2004 | 30 | 3392442379259 | |

View Select History

View All History

Main Screen

210 fig. 20.

MOBILE SHREDDER

CROSS-REFERENCE TO RELATED APPLICATION

The present application is a continuation of U.S. patent application Ser. No. 10/918,249 filed on Aug. 13, 2004, now U.S. Pat. No. 7,198,213, the entire disclosure of which is incorporated hereby by reference.

BACKGROUND OF THE INVENTION

The present invention relates to mobile shredders for shredding documents and other materials at customer sites.

With the increasing incidence of identity theft and other misuse of private or proprietary information, the desirability and necessity of protecting such information is becoming increasingly important. In recent years, laws have been passed in various jurisdictions regulating the use and protection by businesses, health care providers, and other entities, of sensitive or private information on customers, patients, and the like. At the federal level in the United States, the HIPAA and Gramm-Leach-Bliley laws require specific measures, such as document shredding, in order to comply with the laws' provisions for protecting certain designated types of information.

Discarding of sensitive documents in an unshredded state is risky because identity thieves, investigative journalists, and other unscrupulous individuals often engage in "dumpster diving" to retrieve documents from trash dumpsters or garbage cans. Accordingly, the demand for document shredding has surged. For entities having a small amount of documents requiring shredding, personal-sized shredders that are purchased or leased may be adequate. However, for many businesses and other organizations, the large volume of documents and other materials to be shredded makes such an approach impractical. Accordingly, document-shredding service providers have arisen to meet the increasing demand for large-volume shredding.

In the early history of document-shredding services, typically the documents to be shredded were picked up by the service provider and transported to a central facility for shredding. This form of shredding service still represents the prevalent one today. Central document shredding certainly can accomplish its intended purpose, if carried out properly. The drawbacks to central shredding include the necessity of strictly safeguarding the documents against theft or unauthorized access throughout the entire chain of custody from the time the documents are picked up from the customer to the time they are shredded, the necessity of properly documenting the chain of custody and the measures taken to safeguard the documents, and the fact that the users cannot independently verify that the documents were in fact shredded. This latter factor can give rise to a general sense of unease among some users of central shredding services.

Consequently, there is now a trend toward on-site document shredding using mobile shredders. A mobile shredder generally consists of a truck having a shredder mounted therein, and a storage volume for storing the shredded material. Typically, the users place the materials to be shredded in bins or "toters" that usually have wheels for rolling the bins to a location for pickup, such as a curbside location on a street. Mobile shredders typically have some type of bin lift and dump mechanism, such as those commonly employed on garbage collection trucks, for lifting the bins and emptying them into the shredder.

BRIEF SUMMARY OF THE INVENTION

The present invention is aimed at improving upon various aspects of mobile shredders. In accordance with one embodiment of the invention, a mobile shredder for shredding documents and other materials comprises a truck having a truck body defining an enclosure and including a partition in the enclosure that divides a storage volume from the remainder of the enclosure for storage of shredded material in the storage volume, a single-shaft rotary shredder mounted in the enclosure outside the storage volume, the rotary shredder comprising a rotor having cutters rigidly mounted thereon, a bin lift and dump mechanism operable to transport material to be shredded from outside to inside the enclosure so as to deliver material to the rotary shredder, and a discharge conveyor operable to transport shredded material from the rotary shredder through the partition to the storage volume. In a preferred embodiment, the floor of the storage volume comprises a walking floor, and the enclosure has rear doors that are openable to allow shredded material to be discharged from the storage volume through the open rear doors when the walking floor is operated.

In another preferred embodiment, a controller is operatively coupled to the walking floor and to the discharge conveyor, and is operable to control compaction of the shredded material in the storage volume by alternately operating in a first mode wherein the discharge conveyor is operated and the walking floor is stationary, and a second mode wherein the discharge conveyor is operated and the walking floor is operated to carry shredded material away from the discharge conveyor.

The bin lift and dump mechanism in one embodiment of the invention includes a bin-engaging member structured and arranged to grasp a bin that contains material to be shredded, and a powered lift device coupled with the bin-engaging member and operable to lift the bin-engaging member from a first position generally vertically upward to a second position that places the bin in a generally upright orientation adjacent the rotary shredder, and operable then to move the bin-engaging member to a third position that tips the bin so as to dump the material to be shredded from the bin into the rotary shredder. Advantageously, the mobile shredder includes a load sensor associated with the rotary shredder and operable to provide a signal indicative of a load level of the shredder, and the bin lift and dump mechanism further comprises a controller operatively coupled with the load sensor and with the lift device of the lift and dump mechanism. The controller is operable to automatically operate the lift device through a cycle from the second position to the third position and then back to the second position, and is further operable to suspend the cycle to prevent the bin from being emptied into the rotary shredder when the load level indicated by the load sensor exceeds a predetermined limit and to resume the cycle to empty the bin into the rotary shredder when the load level falls below the limit.

In one preferred embodiment, the rotary shredder has a single rotor having an outer surface formed generally as a surface of revolution about an axis, the shredder further including a counter knife arranged in opposition to the outer surface of the rotor, a space being defined between the counter knife and the outer surface of the rotor for passage of material being shredded, and a plurality of cutters rigidly affixed to the outer surface of the rotor, the cutters and counter knife cooperating to shred material. The rotary shredder also advantageously includes an infeed hopper disposed for receiving material to be shredded, and a hydraulic ram positioned beneath the hopper and operable to advance material to be shredded into the space between the rotor and counter knife.

The rotary shredder can be driven in various ways. In one embodiment, a hydraulic drive is coupled to the rotor of the shredder and is operable to receive pressurized hydraulic fluid and drive the rotor, and the mobile shredder includes a hydraulic pump that supplies pressurized hydraulic fluid to the hydraulic ram and to the hydraulic drive of the shredder. The truck comprises an engine including a drive train, and a power takeoff unit is coupled between the drive train and the hydraulic pump for driving the hydraulic pump. The mobile shredder includes a programmed controller operable to control operation of the hydraulic pump and associated valves, and a sensor system in communication with the controller and operable to monitor a plurality of operating parameters of the rotary shredder and truck, the controller being programmed to provide an alarm indication when one or more of the operating parameters is outside a predetermined normal range. Preferably, the controller is operable to provide a relatively low level of alarm when the sensor system indicates an abnormal condition of the rotary shredder or associated components, and to provide a relatively higher level of alarm when the sensor system indicates an abnormal condition of the truck.

The sensor system can monitor a level of fuel remaining in a fuel tank for the engine, and the controller can provide a first type of alarm indication when the level of fuel falls below a predetermined first value (e.g., one-eighth of a tank). For example, the first type of alarm indication can be effected by causing the vehicle horn to sound intermittently with a relatively low frequency (e.g., the horn can sound for half a second, once every five seconds). The controller can provide a second type of alarm indication (e.g., the horn can sound for half a second, once every second) when the level of fuel falls below a predetermined second value (e.g., one-sixteenth of a tank). Alternatively or additionally, the controller can be operable to shut down the engine when the level of fuel falls below a predetermined level so as to avoid running out of fuel; this is particularly advantageous for diesel trucks wherein running out of fuel is a major event.

The power takeoff unit preferably is selectively engageable with and disengageable from the drive train, and the mobile shredder preferably includes a programmed controller operable to control operation of the hydraulic pump and to control engagement and disengagement of the power takeoff unit with the drive train. The mobile shredder can include various sensors for monitoring conditions and detecting when it is safe or unsafe to engage or disengage the power takeoff unit or to shut down the hydraulic pump. For example, in one embodiment, an engine RPM sensor can measure engine RPMs, and the controller can prevent the power takeoff unit from being engaged with or disengaged from the drive train when the engine RPMs are above a predetermined limit. It is also possible to employ a transmission sensor to detect whether or not a transmission of the drive train is in a neutral gear, and the controller can prevent the power takeoff unit from being engaged with the drive train unless the transmission is in a neutral gear.

In another embodiment, the mobile shredder includes a pump sensor operable to measure a load level of the hydraulic pump, and the controller is operable to prevent the hydraulic pump from being shut down when the load level measured by the pump sensor is above a predetermined limit.

In accordance with a further aspect of the invention, a mobile shredder includes a bin lift and dump mechanism operable to lift a bin that contains material to be shredded and to tip the bin to dump the material into the rotary shredder, the bin lift and dump mechanism comprising a lift device traversable upwardly and downwardly within a channel defined in one side of the truck body, the channel being open along an outer surface of the one side of the truck body. A movable door is connected to the truck body and is movable between a closed position closing the channel and an open position permitting access to the channel so that a bin can be lifted by the bin lift and dump mechanism. The mobile shredder includes an actuator coupled with the door for opening and closing the door.

Preferably, a door sensor system is operable to detect whether the door is in the open position or in the closed position, and a programmed controller in communication with the door sensor system is operable to control operation of the rotary shredder and to control operation of the actuator for the door.

In another embodiment, a programmed controller is operable to control operation of the rotary shredder, and an operator control panel is coupled with the controller and includes a plurality of operator controls manipulable by an operator, the operator controls including at least a start control for initiating operation of the bin lift and dump mechanism. Preferably, the controller is operable to operate the bin lift and dump mechanism in either an automatic mode wherein the bin lift and dump mechanism goes through a complete cycle of lifting a bin, dumping the material from the bin into the rotary shredder, and lowering the bin back down without continuous operator intervention, or a manual mode allowing an operator to control operation of the bin lift and dump mechanism. The controller preferably is programmed to operate in the automatic mode upon an operator continuously depressing the start control for at least a predetermined minimum amount of time.

In yet another aspect of the invention, a mobile shredder includes a sensor system comprising sensors for measuring a plurality of operating parameters associated with the mobile shredder, a programmed controller coupled with the sensor system and operable to control operation of the rotary shredder and the bin lift and dump mechanism, an operator interface coupled with the controller and including operator controls manipulable by an operator to cause the controller to execute routines programmed in the controller, and a visual display for displaying information for an operator. The controller includes a memory storing an event history file and is operable to record significant events in the history of operation of the mobile shredder in the event history file, and the operator interface is operable to display the event history file on the visual display.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a top elevation of a mobile shredder in accordance with one embodiment of the invention, partially broken away to show internal features of the mobile shredder;

FIG. 2 is a road-side elevation of the mobile shredder, along line 2-2 in FIG. 1;

FIG. 3 is a curb-side elevation of the mobile shredder, along line 3-3 in FIG. 1;

FIG. 4 is a perspective view of the mobile shredder, generally from curb-side;

FIG. 18 depicts a mobile shredder inputs and outputs page displayed on the touch screen when selected from the main troubleshooting menu of FIG. 17;

Figure 19:
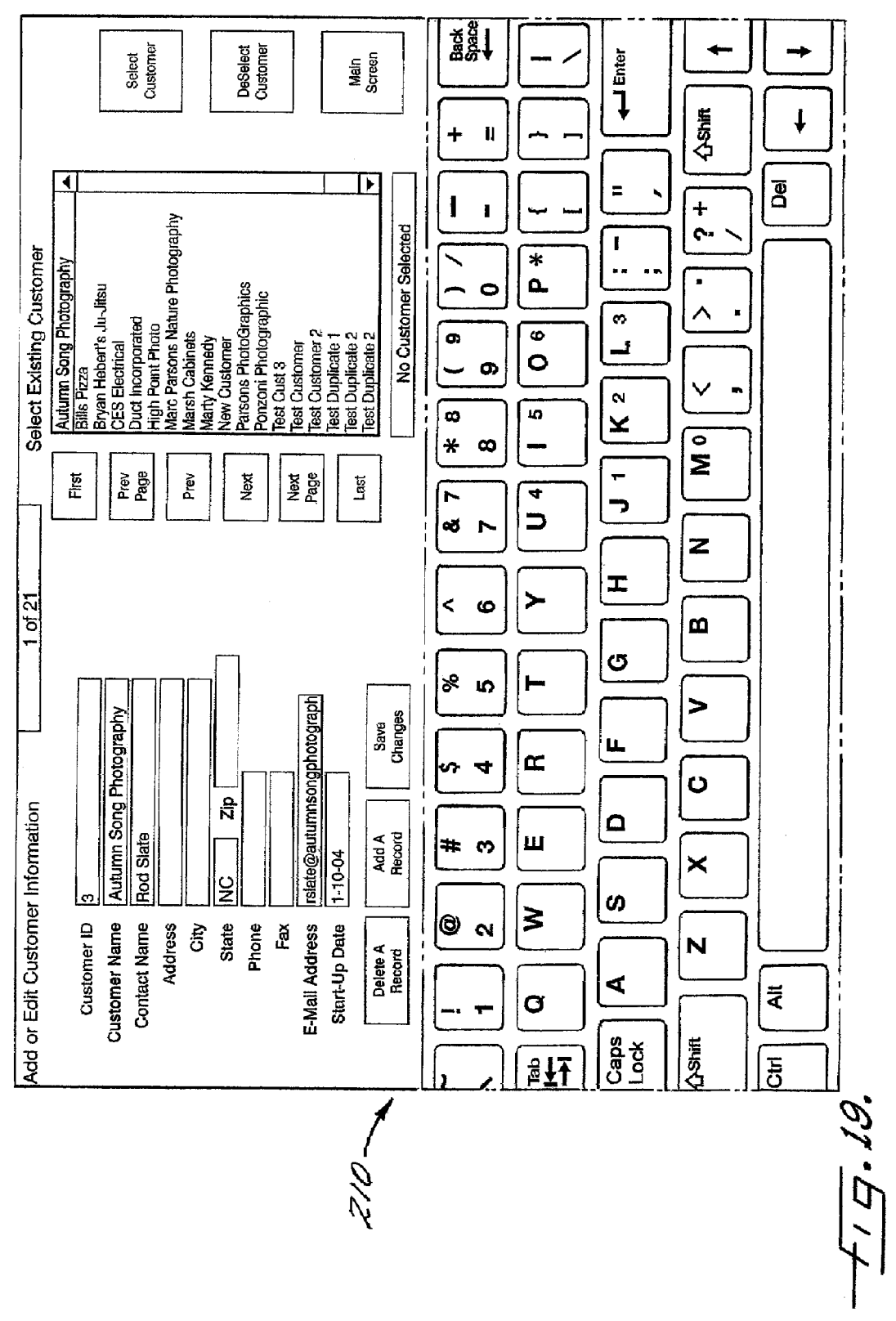

FIG. 19 shows a job setup page displayed on the touch screen when selected from the main menu of FIG. 15A/B;

FIG. 20 depicts an event history page displayed on the touch screen when selected from the main troubleshooting menu of FIG. 17.

DETAILED DESCRIPTION OF THE INVENTION

Figure 5:
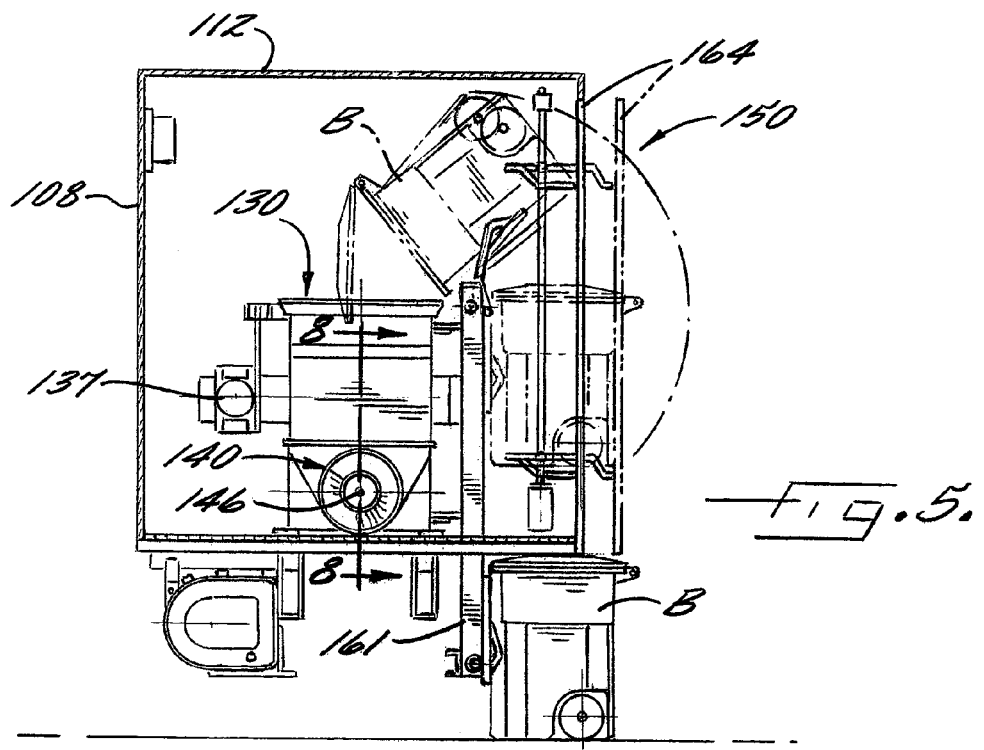
FIG. 5 is a view along line 5-5 in FIG. 3, showing the bin lift and dump mechanism being operated through a lift and dump cycle.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overall System Description

A mobile shredder 100 in accordance with one embodiment of the invention is depicted in FIGS. 1-4. The mobile shredder 100 comprises a truck having a cab 102 for accommodating a driver and passenger, and a truck body 104 of generally box-shaped construction. The truck body has a floor 106, a road-side wall 108, a curb-side wall 110, a ceiling 112, a front wall 114, and a pair of rear doors 116. The walls 108, 110, 114 and ceiling 112 and rear doors 116 can comprise various materials, but advantageously comprise a fiber-reinforced polymer (FRP) material such as fiber glass or the like, for high strength-to-weight ratio.

The truck body defines an interior space that is subdivided into two portions by a partition 118 that extends between the two side walls 108, 110 at a location axially spaced behind the front wall 114. As further described below, the space between the partition 118 and the rear doors 116 defines a storage volume 120 for storage of shredded material. The space forward of the partition defines a location for the primary working components of the mobile shredder.

Thus, in the forward space of the truck body, a single-shaft rotary shredder 130 is mounted on the floor 106. The structure and operation of the rotary shredder 130 are described in detail below in connection with FIG. 8, but for present purposes it is sufficient to note that the rotary shredder receives material to be shredded, shreds the material into small flake-like pieces, and passes the shredded material to a discharge conveyor 140, which advantageously can comprise an auger as shown. The discharge conveyor is located forward of the partition 118 and is arranged to convey the shredded material through an opening in the partition into the storage volume 120 as shown in FIG. 2.

Also located forward of the partition 118 is a bin lift and dump mechanism 150 operable to lift a bin B containing material to be shredded and to tip the bin to dump the contents of the bin into the rotary shredder 130. The structure and operation of the bin lift and dump mechanism 150 are described below in connection with FIGS. 5, 6, 7A, and 7B.

The floor of the storage volume 120, in one embodiment of the invention, comprises a "live" or "walking" floor 180 as further described below in connection with FIGS. 11 through 13. The walking floor 180 is operable to discharge the shredded material out the rear end of the storage volume 120 when the rear doors 116 are opened.

Single-Shaft Rotary Shredder

The single-shaft rotary shredder 130 is generally of the type described in U.S. Patent Application Publication No. US2004/0118958A1 and in European Patent EP 419 919 B1, the entire disclosures of which are incorporated herein by reference. With primary reference to FIGS. 1 and 8, the single-shaft shredder comprises a rotor 131 that carries cutters as further described below, and a counter knife 132 that works in conjunction with the rotor to grind up or shred material fed into the space where the rotor and counter knife converge. The counter knife is generally stationary, although it can be flexibly supported so that it can "give" to some extent when a very hard object (e.g., a piece of metal or a rock) is inadvertently fed into the space between the rotor and counter knife, the flexibility thereby tending to prevent damage to the machine. The ground up or shredded material exits through a screen 133 having apertures suitably sized to regulate the size of the pieces of shredded material. The shredder 130 also includes a hopper 134 for receiving material to be shredded, and a hydraulic ram 135 or the like for feeding the material into the space between the rotor and counter knife.

The rotor 131 is generally cylindrical in form, but the outer surface of the rotor defines a series of circumferential ridges or ribs (not shown) that project radially outwardly. Each rib can have opposite side faces that are conical and oppositely inclined to the rotor axis, and a radially outermost surface that is parallel to the rotor axis. Thus, in the axial direction along the rotor, the outer surface defines a series of alternating peaks (where the ribs are) and valleys between the peaks. The counter knife 132 has a series of teeth (not shown) that are axially aligned with the valleys between the ribs of the rotor, there being one such tooth for every valley in the rotor surface. Correspondingly, there are V-shaped recesses between the teeth of the counter knife that are axially aligned with the ribs of the rotor; thus, the rotor surface and the counter knife are complementary in configuration.

Rigidly mounted to the outer surface of the rotor 131 are a plurality of cutters 136 that are axially aligned with the ribs and with the V-shaped recesses in the counter knife. Material that is fed into the space between the rotor 131 and counter knife 132 is cut by the cutters 136 as they mesh with the counter knife. Various configurations can be used for the rotor surface, the cutters, and the counter knife, depending on the nature of the materials to be shredded. Where plastic film may constitute some of the materials to be shredded, the shredder design described in the aforementioned U.S. Patent Application Publication No. 2004/0118958A1, having both V-shaped cutters and flat cutters, is particularly advantageous. Where the materials to be shredded constitute substantially entirely paper documents and the like, alternative designs such as that described in the aforementioned EP 419 919B1 can be used.

In operation, materials to be shredded are dumped into the infeed hopper 134 of the rotary shredder. The hydraulic ram 135 is operated to push the materials into the space between the rotor 131 and counter knife 132. The materials are shredded and pass through the screen 133 into the discharge conveyor 140.

The rotary shredder 130 is hydraulically driven. A hydraulic drive 137 receives pressurized hydraulic fluid from a hydraulic pump 190 (FIG. 14) and drives the rotor 131. The hydraulic ram 135 also is driven by pressurized hydraulic fluid from the pump 190. The supply of hydraulic fluid to the hydraulic drive 137 and hydraulic ram 135 is controlled by suitable electrically controlled valves 202 (FIG. 14) or the like, the operation of which is controlled by a computer controller as further described below.

Discharge Conveyor

Figure 8:
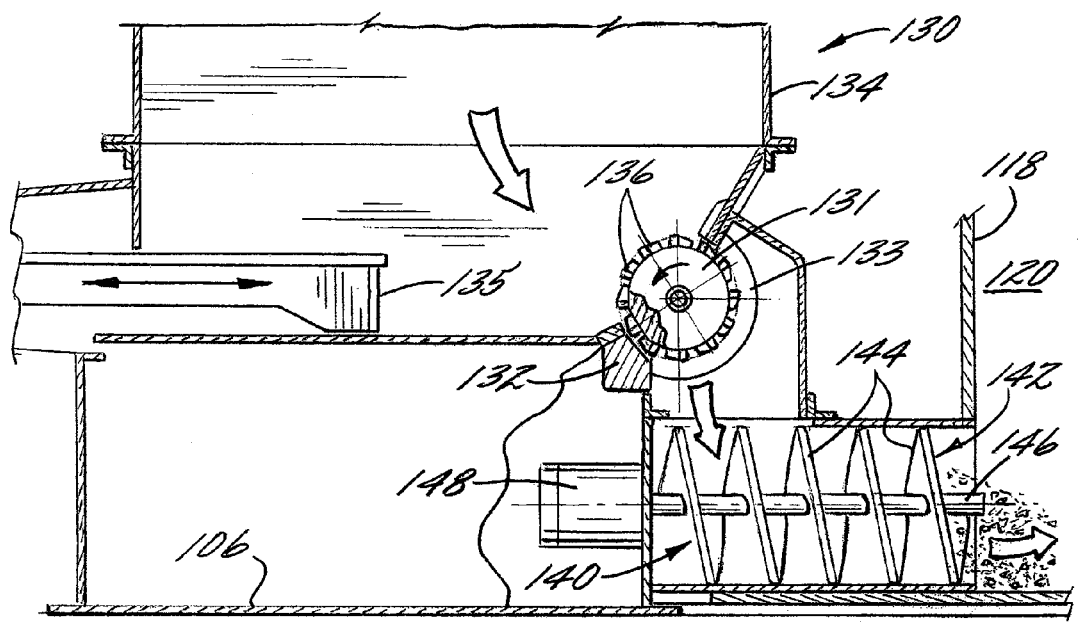
FIG. 8 is a cross-sectional view along line 8-8 in FIG. 5, showing the infeed hopper, ram, shredder, and discharge auger in accordance with one embodiment of the invention.

The discharge conveyor 140 is best seen in FIG. 8. It comprises an auger 142 having helical flights 144 mounted on a central shaft 146. The auger 142 is disposed within a cylindrical casing 147 that defines an opening therein for receiving shredded material from the rotary shredder. The auger is driven by a hydraulic drive 148 that receives pressurized hydraulic fluid from the pump 190; suitable valves 202 (FIG. 14) are employed for controlling the supply of hydraulic fluid to the drive 148. The cylindrical casing 147 communicates with an opening through the partition 118 so that shredded material is fed by the auger 142 through the opening into the storage volume 120 of the truck.

Bin Lift and Dump Mechanism

The bin lift and dump mechanism 150 is now described with primary reference to FIGS. 5, 6, 7A, and 7B. The bin lift and dump mechanism comprises a bin-engaging member 151 structured and arranged to grasp a bin B that contains material to be shredded, and a powered lift device coupled with the bin-engaging member 151 and operable to lift the bin-engaging member from a first position (e.g., ground level as shown in solid lines in FIGS. 5 and 7A) generally vertically upward to a second position (the middle position shown in phantom lines in FIG. 5) that places the bin in a generally upright orientation adjacent the rotary shredder 130, and operable then to move the bin-engaging member 151 to a third position (the top position in FIG. 5) that tips the bin so as to dump the material to be shredded from the bin into the rotary shredder.

Figure 6:
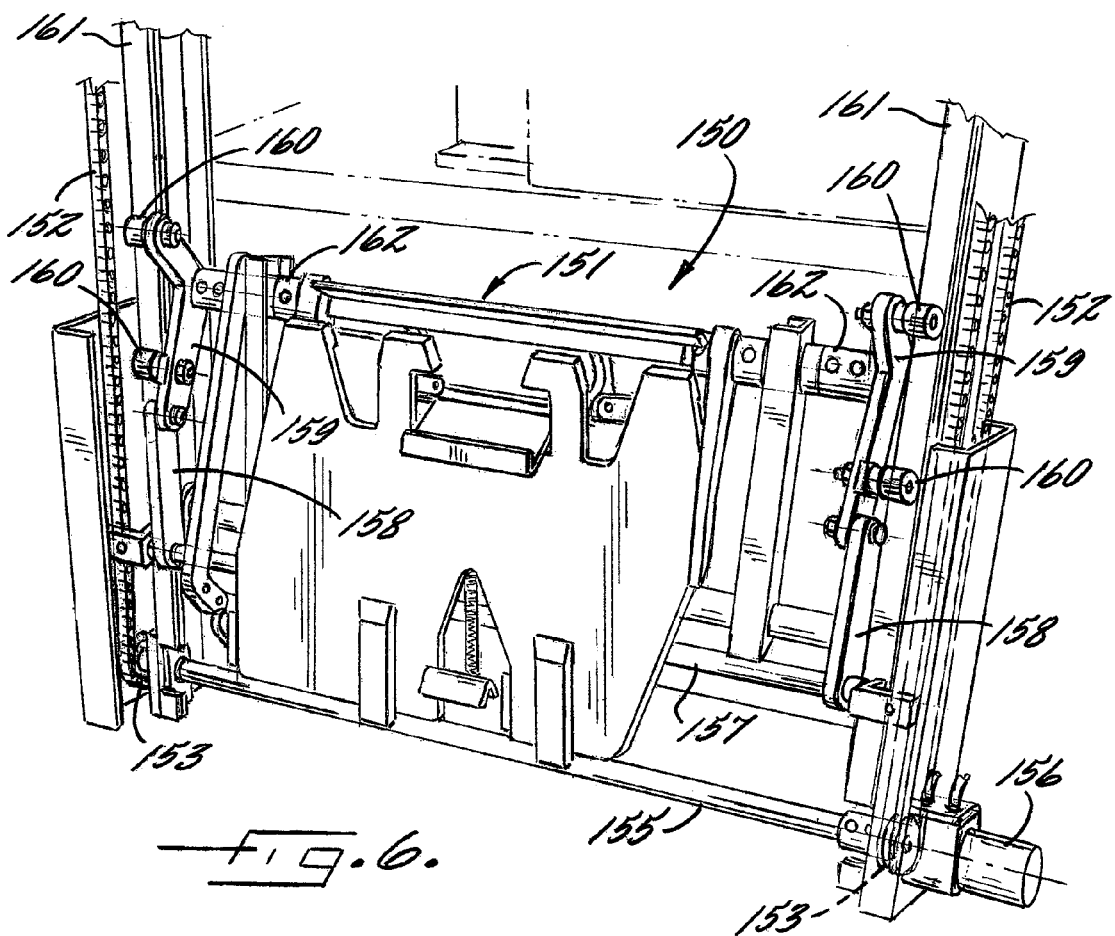
FIG. 6 is a detailed perspective view of the bin-engaging part of the bin lift and dump mechanism.
Figures 7A, 7B:
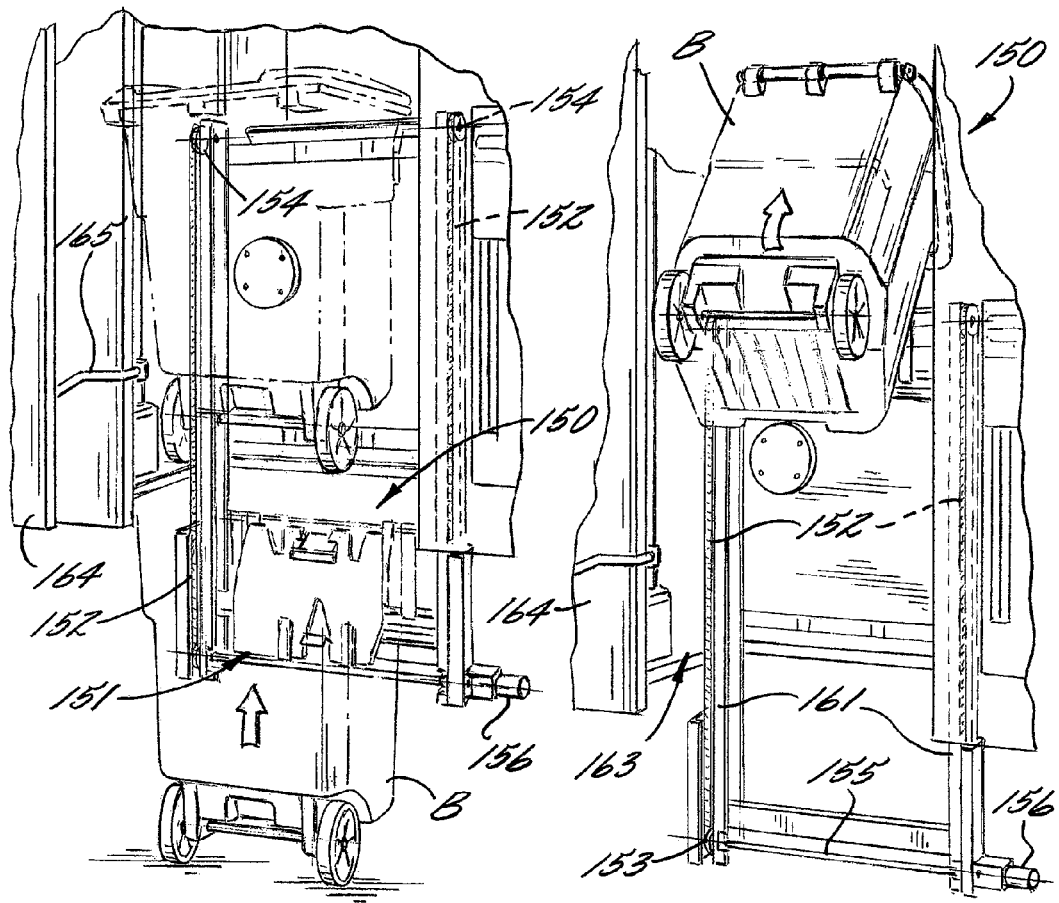
FIG. 7A is a perspective view of the bin lift and dump mechanism, showing a bin being lifted from ground level to a raised level.
FIG. 7B is a perspective view showing the bin being tipped to dump its contents into the shredder.

As best seen in FIG. 6, the powered lift device includes a pair of spaced chains 152 arranged in vertically extending loops about drive sprockets 153 and idler sprockets 154 (FIG. 7A). A drive shaft 155 connects the two drive sprockets 153 of the respective chains 152, and the drive shaft is coupled to a hydraulic drive 156 that receives pressurized hydraulic fluid from the hydraulic pump 190 (FIG. 14) for driving the shaft and hence the drive sprockets so that the chains rotate. A transverse rod 157 is attached at its opposite ends to the chains 152. Adjacent each end of the rod 157, the lower end of a link arm 158 is pivotally mounted to the rod; the upper end of each link arm 158 is pivotally connected to the lower end of a generally L-shaped link arm 159. The upper ends of the L-shaped link arms 159 have rollers 160 mounted thereon, and the rollers are arranged to roll along respective vertical track members 161 each located adjacent one of the chains 152. Rollers 160 are also affixed to the L-shaped link arms 159 at positions proximate the lower ends of the arms, for rolling along the track members 161. The vertex of each L-shaped link arm 159 is non-pivotally attached to a respective end of a transversely extending mounting portion 162 of the bin-engaging member 151 at an upper end of the bin-engaging member.

The track members 161 define upper stops (not shown) that limit how far the upper rollers 160 of the L-shaped link arms can travel vertically upward. When the hydraulic drive 156 is operated to drive the chains 152 so as to lift the transverse rod 157 vertically upward, the link arms 158 push the L-shaped link arms 159 upward, and both pairs of rollers 160 roll along the track members until the upper pair of rollers are stopped from further upward travel by the stops. However, the transverse rod 157 can continue to travel upwardly; this further upward travel is accommodated by rotation of the L-shaped link arms 159 about the upper pair of rollers 160, which causes the lower pair of rollers 160 to leave contact with the track members 161. This rotation of the L-shaped link arms 159 about the upper rollers 160 causes the bin-engaging member 151 to be pivoted to tip the bin B and dump its contents into the rotary shredder as shown in the top position in FIG. 5.

Figure 9:
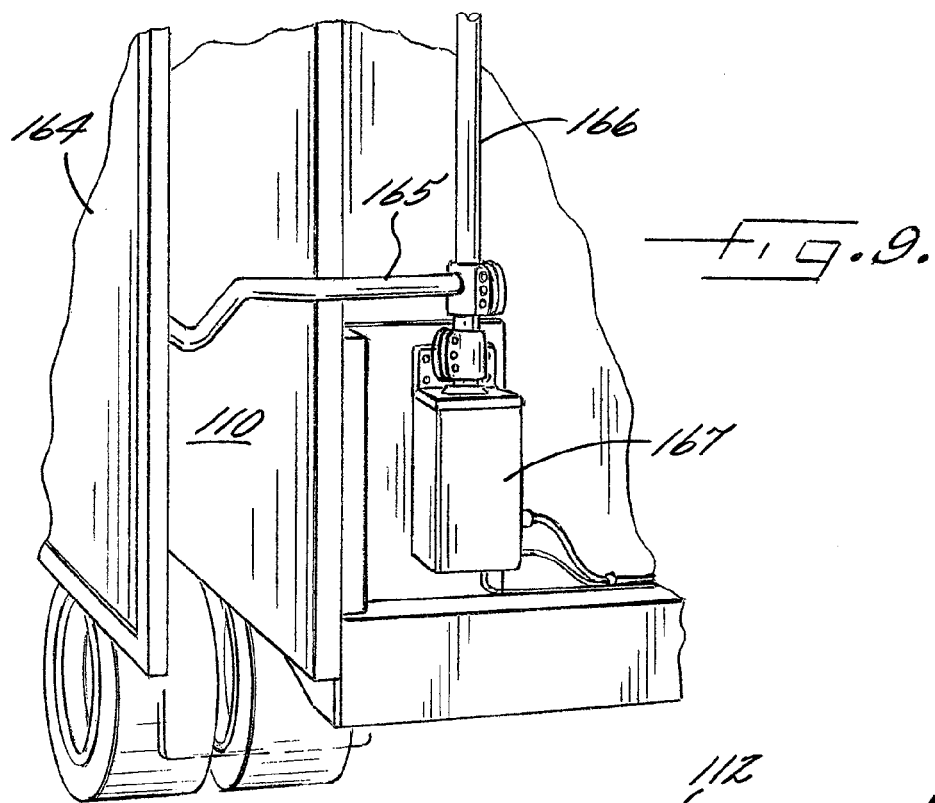
FIG. 9 is a perspective view showing details of the movable door for closing the channel of the bin lift and dump mechanism.
Figure 10:
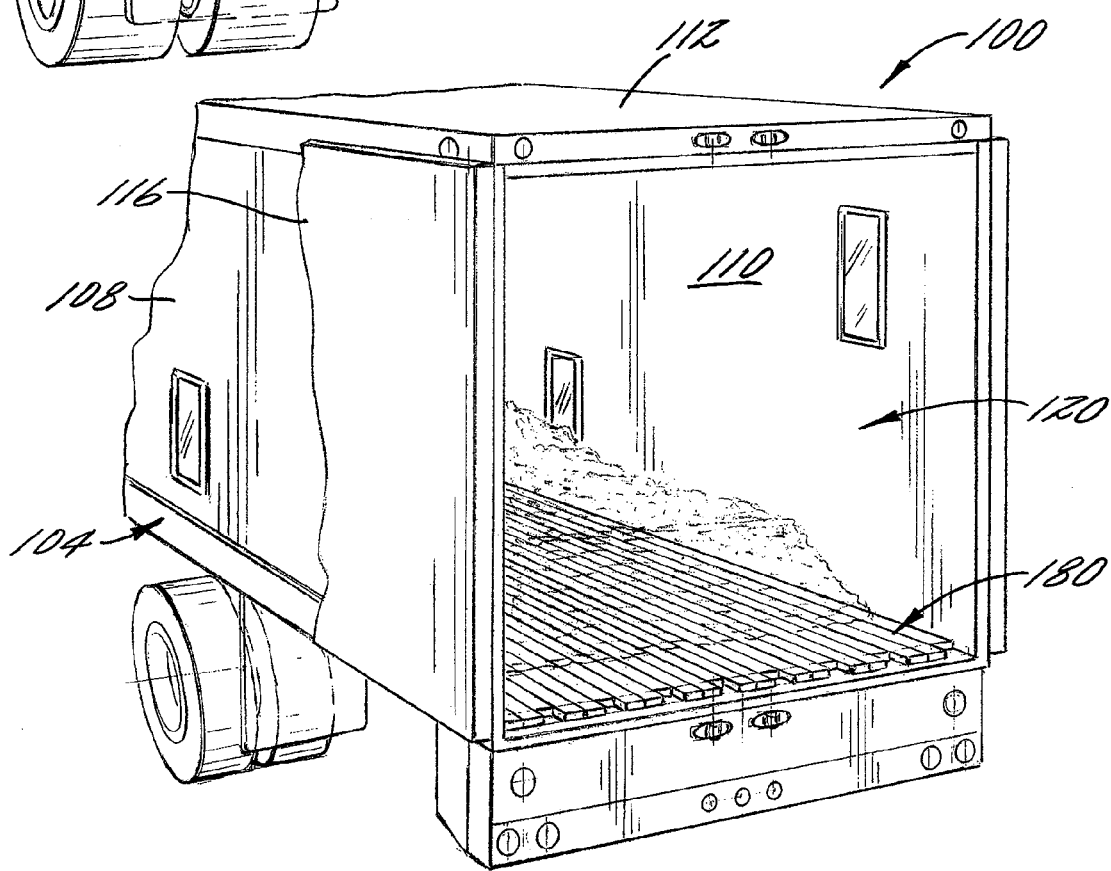
FIG. 10 is a rear perspective view of the mobile shredder, showing the rear doors open in preparation for discharging shredded material from the storage volume.

The lift and dump mechanism 150 is located in an opening or channel 163 in the curb-side wall 110 of the truck body. A movable door 164 is provided for covering the channel 163 when the lift and dump mechanism is not being used, such as when the mobile shredder is traveling on the road. The door 164 is shown in its closed position in solid lines in FIGS. 1, 3, and 5, and is shown in its open position in phantom lines in FIGS. 1, 3, and 5, and in solid lines in FIGS. 4, 7A, 7B, and 9. The door 164 is supported by arms 165 that are mounted on a rotatable vertical shaft 166 coupled to a rotary pneumatic actuator 167 (FIG. 9) or the like. The shaft 166 and actuator 167 are mounted to the truck body, recessed within the channel 163. Rotation of the actuator 167 in one direction opens the door 164, and rotation in the other direction closes the door. Advantageously, a sensor associated with the actuator 167 detects when the door is open or closed, and the computer controller is operable to prevent operation of the rotary shredder unless the door is open.

The operation of the lift and dump mechanism 150 is also controlled by the computer controller, which regulates operation of the hydraulic drive 156 by controlling suitable electrically controlled valves 202 (FIG. 14) so as to control the supply of hydraulic fluid to the drive. Advantageously, the controller is programmed to control the lift and dump mechanism in such a way as to avoid overloading the rotary shredder 130. More particularly, the controller is programmed to prevent the lift and dump mechanism from tipping a bin to dump its contents into the rotary shredder whenever a load level of the shredder, as detected by a suitable sensor 138 (FIG. 14), is above a predetermined limit.

In one embodiment, an operator control panel 170 (FIG. 15A) is coupled with the controller and includes a plurality of operator controls manipulable by an operator, the operator controls including a start button 171a for initiating operation of the bin lift and dump mechanism. Preferably, the controller is operable to operate the bin lift and dump mechanism in either an automatic mode wherein the bin lift and dump mechanism goes through a complete cycle of lifting a bin, dumping the material from the bin into the rotary shredder, and lowering the bin back down without continuous operator intervention, or a manual mode allowing an operator to control operation of the bin lift and dump mechanism. The controller preferably is programmed to operate in the automatic mode upon an operator continuously depressing the start button 171a for at least a predetermined minimum amount of time.

In an automatic mode cycle, once the start button 171a has been depressed for at least the predetermined minimum amount of time, the controller takes over control of the lift and dump mechanism. With reference to FIG. 5, the controller then operates the lift and dump mechanism to lift the bin B from ground level up to a raised holding level (middle position in FIG. 5). If the load level of the rotary shredder is above the predetermined limit, the bin is held at this holding level until the load level falls below the limit; the bin is then lifted farther up and tipped to dump its contents into the rotary shredder. The controller then turns the control of the lift and dump mechanism back over to the operator for manual control.

In the manual or operator-controlled mode of operation, with the bin at the holding level, the start button 171a can be depressed to cause the bin to be tilted once again to empty the bin into the shredder. This can be necessary, for example, if some of the contents remain in the bin after the automatic dumping cycle. Alternatively, with the bin at the holding level, the operator can press the stop button 171b to cause the bin to be lowered back to the ground.

The operator control panel 170 preferably is arranged behind a door 172 that can be closed to prevent access to the panel. The door 172 can comprise a flexible material that is foldable and slides in tracks 173 similar to an automobile sun roof. The door can be opened and closed by an electric motor (not shown). In one embodiment, the computer controller is operable to prevent operation of the rotary shredder when the controls door 172 is in the closed position.

Walking Floor

Figure 11:
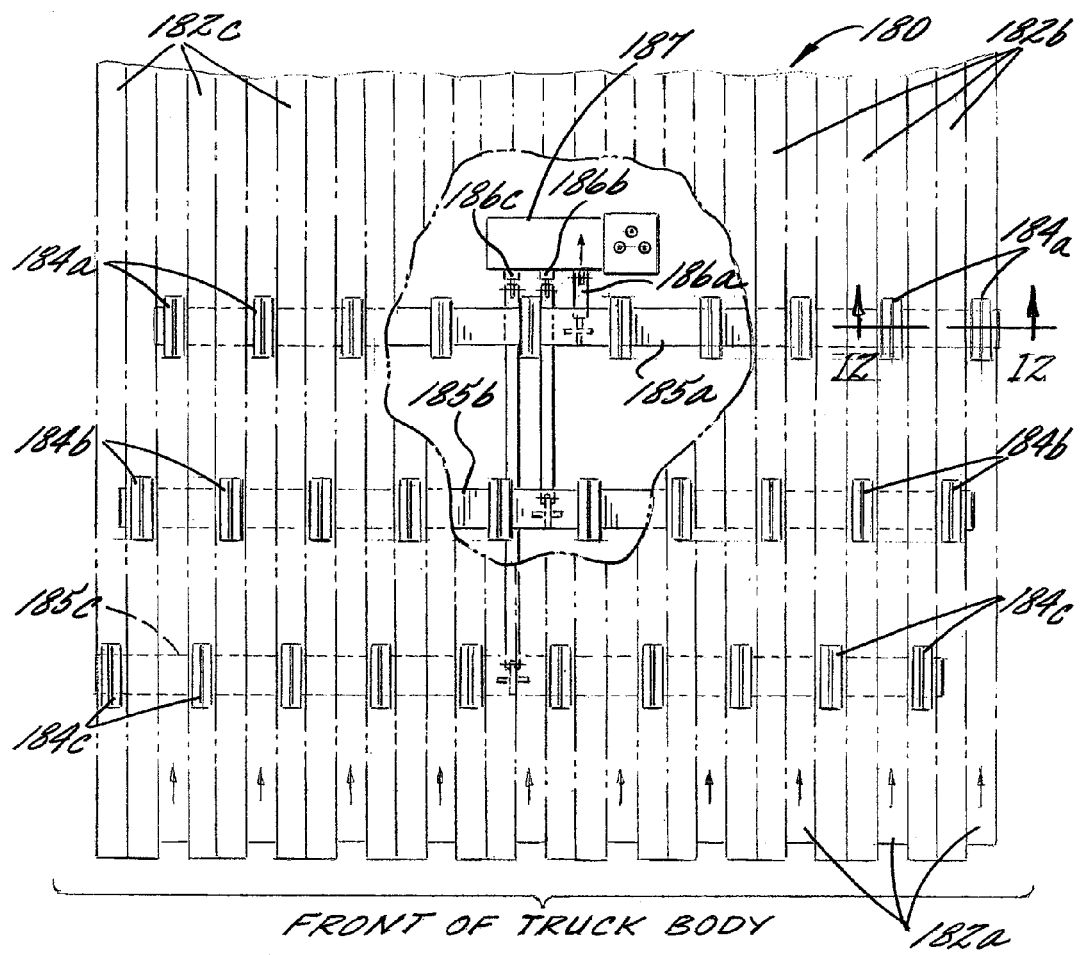
FIG. 11 is a top elevation of the walking floor, with the slats partially broken away to show the hydraulic drive arrangement.
Figure 12:
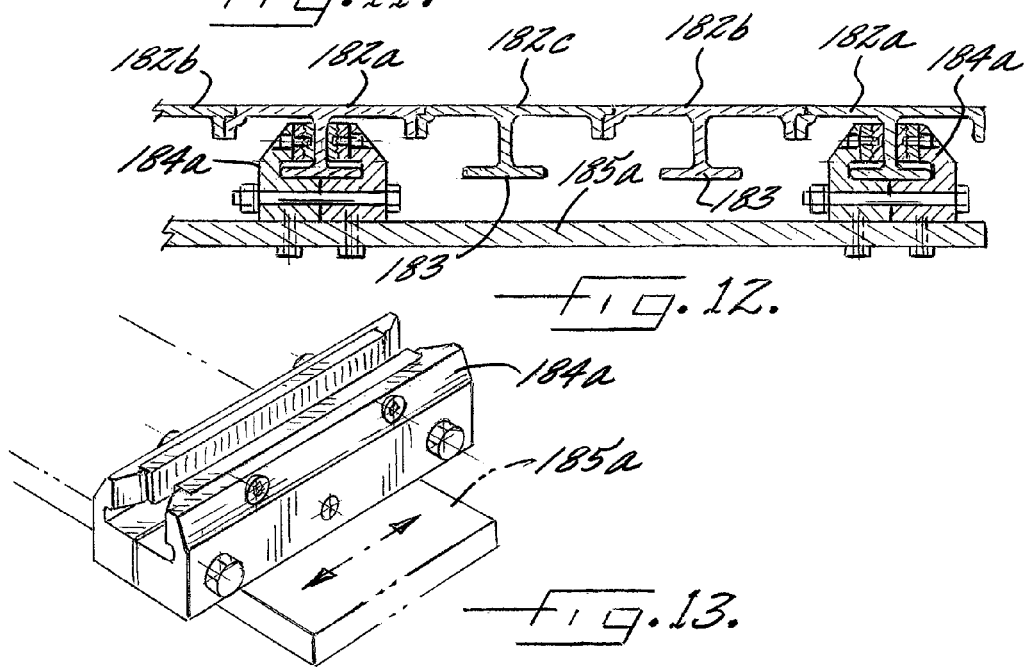
FIG. 12 is a cross-sectional view along line 12-12 in FIG. 11.
Figure 13:
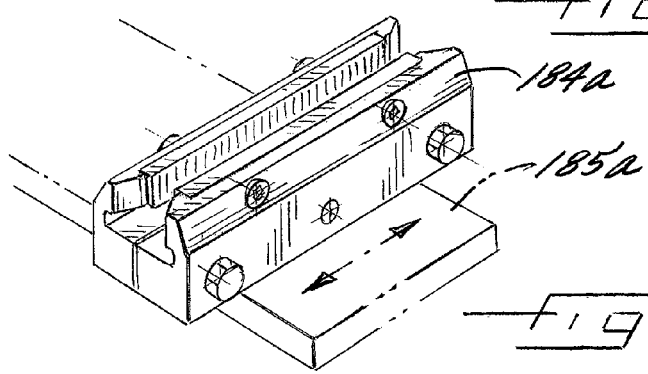
FIG. 13 is a perspective view of a clamp member for one group of slats of the walking floor.

The walking floor 180 is now described with primary reference to FIGS. 11 through 13. The walking floor comprises a plurality of axially extending, parallel slats arranged in three groups 182a, 182b, 182c that alternate in "a, b, c, a, b, c . . . " fashion. The slats advantageously are generally I-shaped in cross-section, having depending dovetails 183 that are clamped in clamp members 184a, 184b, 184c, respectively, for the three groups of slats. All of the first clamp members 184a are affixed to a transversely extending support plate 185a so they move together as a unit, and likewise the second group of clamp members 184b are affixed to support plate 185b, and the third group of clamp members 184c are affixed to support plate 185c. Thus, each group of slats is independently movable, as a unit. Each group of slats is driven by its own hydraulic cylinder 186a, 186b, 186c, respectively, that form a drive unit 187. Thus, the hydraulic cylinder 186a is coupled with the support plate 185a for the first group of slats 182a, and likewise the other two hydraulic cylinders 186b and 186c are respectively coupled with the support plates 185b and 185c. The hydraulic cylinders are operated in unison so that all of the slats 182a, b, c are advanced rearwardly at the same time so as to move the shredded material resting on the walking floor toward the rear of the truck. Then one hydraulic cylinder is operated at a time to slide each group of slats forward; thus, all of the first slats 182a are slid forward as shown by the arrows in FIG. 11, then all slats 182b are slid forward, and finally all slats 182c are slid forward. When one group at a time is moved, the pile of shredded material atop the walking floor tends to stay in place because of the friction between the material and the two stationary groups of slats. Thus, the material is "walked" rearwardly to gradually move the shredded material out the open rear doors 116 of the truck.

Power Takeoff and Hydraulics

Figure 14:
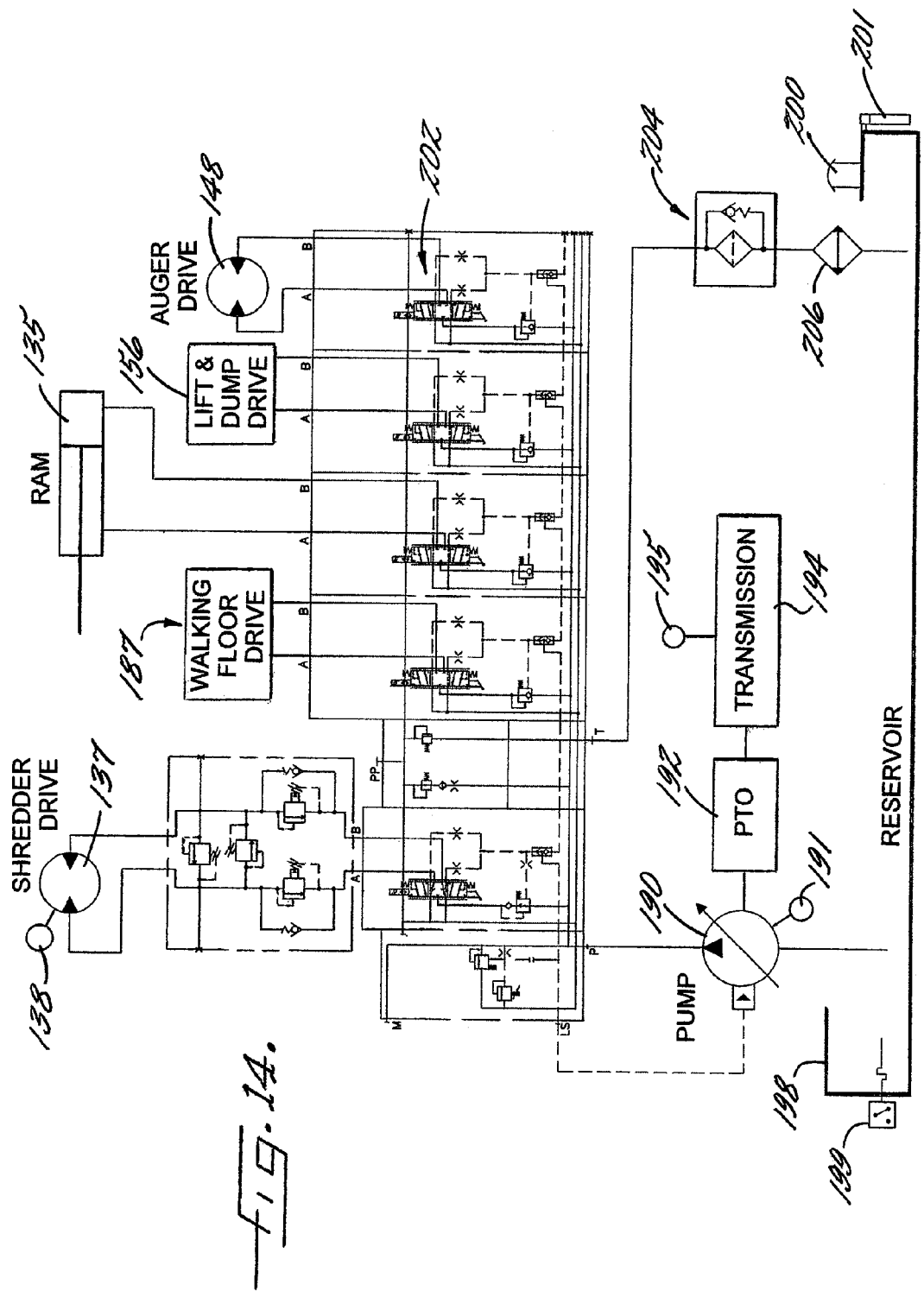
FIG. 14 is a schematic diagram of the hydraulic system of the mobile shredder.

FIG. 14 is a schematic diagram of the hydraulic system of the mobile shredder in accordance with one embodiment of the invention. As noted, a hydraulic pump 190 supplies pressurized hydraulic fluid to various hydraulically driven components of the mobile shredder. A pump sensor 191 monitors a load level of the pump; advantageously, the computer controller is programmed to prevent the pump from being shut down when the load is above a predetermined level. The hydraulic pump is driven by a power takeoff unit 192 that is selectively engageable and disengageable. The power takeoff unit's engagement with and disengagement from the transmission 194 is controlled by the mobile shredder's computer controller. A transmission sensor 195 can detect whether or not the transmission is in a neutral gear; advantageously, the controller is programmed to prevent engagement of the power takeoff unit with the transmission if the transmission is not in neutral.

Hydraulic fluid is contained in a reservoir 198; temperature of the hydraulic fluid in the reservoir is monitored by a temperature sensor 199. The reservoir also includes a breather cap 200 and a fluid level sensor 201. The hydraulic pump 190 supplies pressurized hydraulic fluid to the rotary shredder drive 137, to the walking floor drive 187, to the bin lift and dump drive 156, to the hydraulic ram 135, and to the discharge auger drive 148. The pressurized hydraulic fluid is supplied to these components via a plurality of electrically controllable valves (e.g., spool valves controlled by solenoids or the like), collectively designated by reference number 202. The valves 202 are coupled with the computer controller, which controls the valves to supply hydraulic fluid or discontinue supply of hydraulic fluid to each of the various components as needed. Hydraulic fluid is returned to the reservoir 198 via an oil filter 204 and a thermal transfer cooler 206.

Operator Controls

Figure 15:
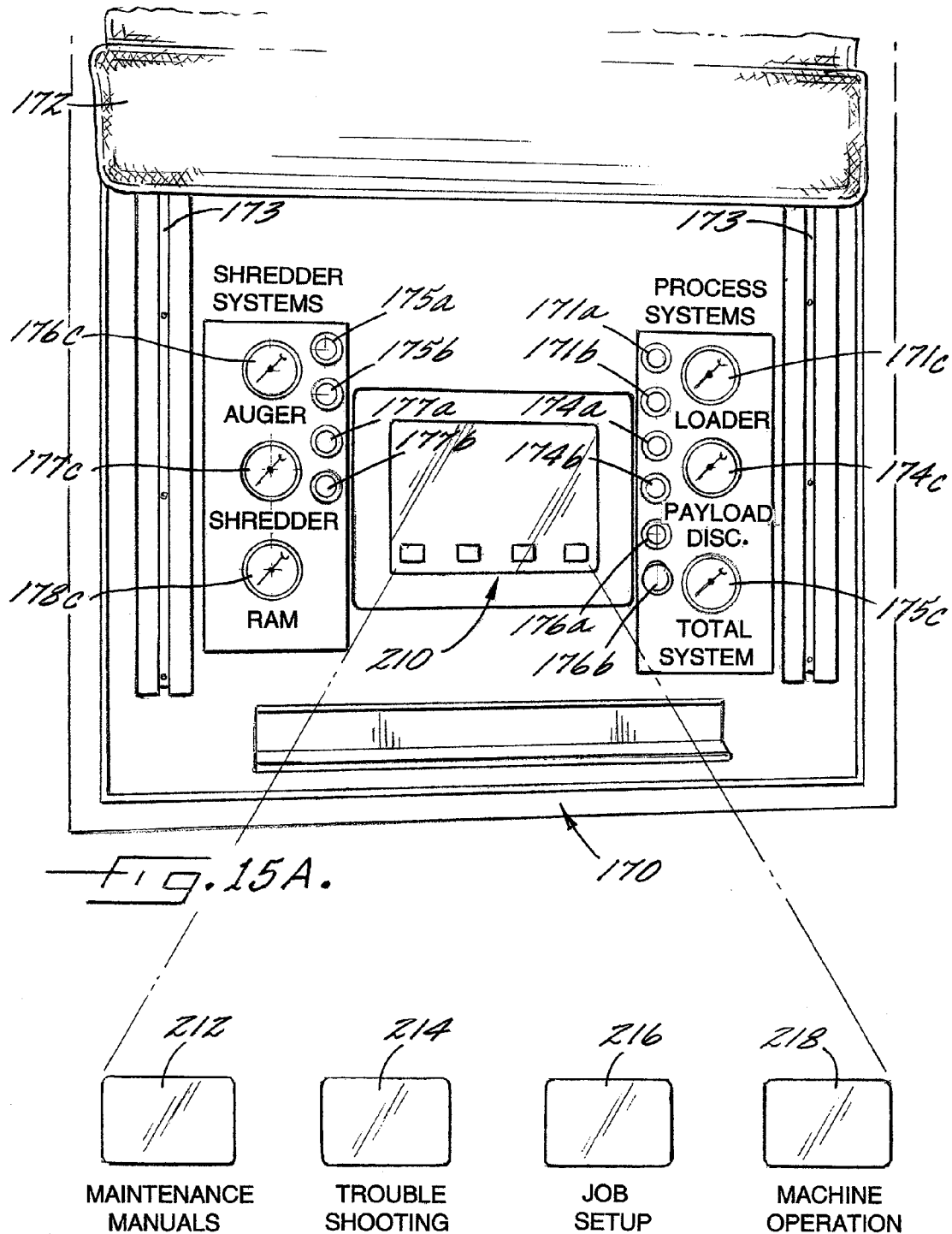
FIG. 15A depicts the controls panel for the mobile shredder.
FIG. 15B shows a portion of a touch screen of the controls panel.
Figure 16:
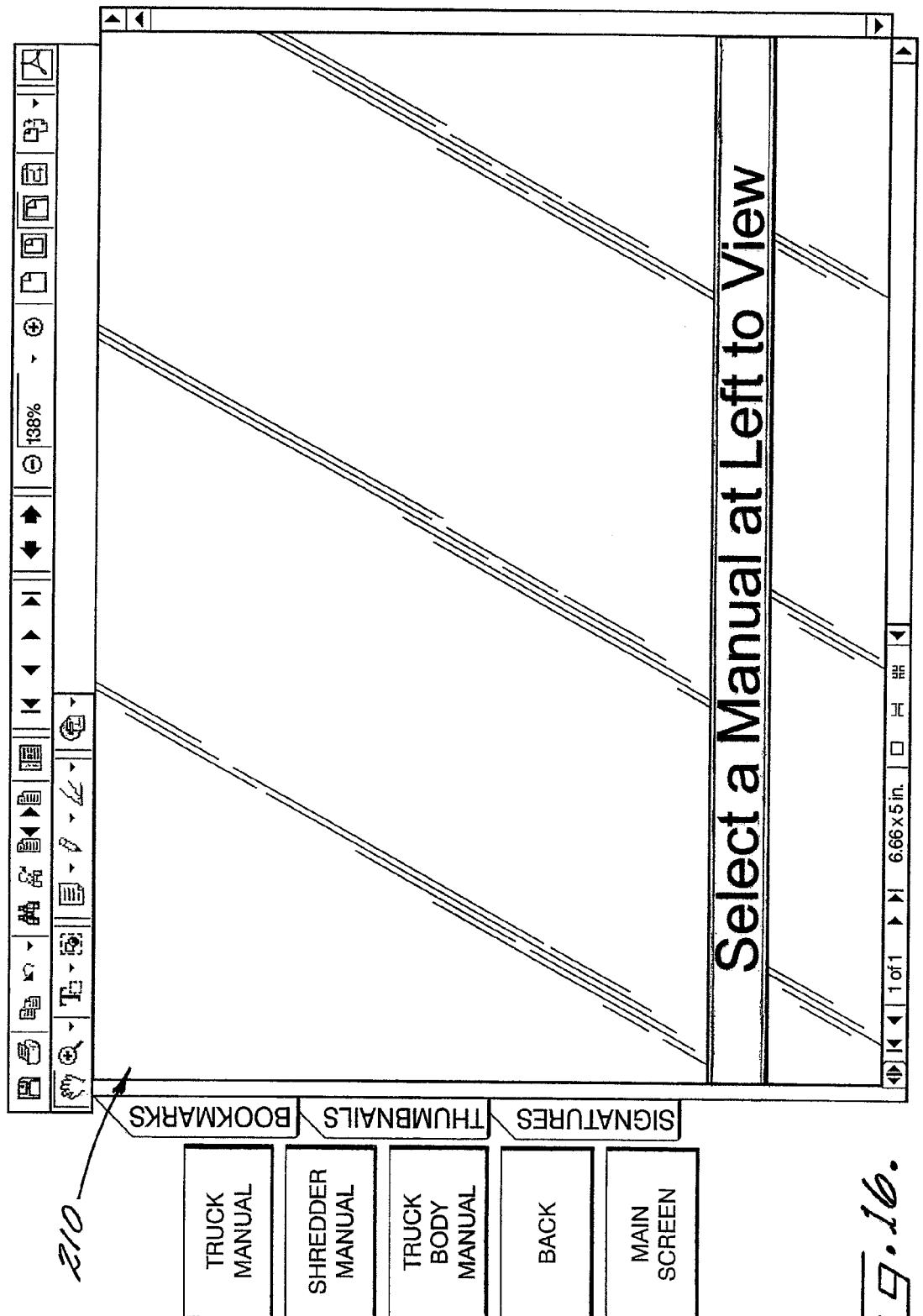
FIG. 16 depicts a main maintenance manual menu displayed on the touch screen.

The operator controls for the mobile shredder are now described with primary reference to FIGS. 15A, 15B, and 16-21. As already noted, the mobile shredder includes a controls panel 170, as depicted in FIGS. 15A and 15B. The controls panel includes control buttons for controlling the various components of the mobile shredder. The control buttons include: the previously described lift and dump start button 171a, and a lift and dump stop button 171b for interrupting operation of the lift and dump mechanism during an automatic cycle; a walking floor start button 174a and a walking floor stop button 174b; a total system start button 175a and a total system stop button 175b; a system reset button 176a and an emergency stop button 176b; and a rotary shredder start button 177a and a rotary shredder stop button 177b. There are no separate start and stop controls for the discharge auger, as the auger starts and stops with the system, and thus is effectively controlled by the system start and stop buttons 175a,b. The controls panel also includes a number of gauges for monitoring hydraulic pressure in the various hydraulically driven components, including: a lift and dump pressure gauge 171*c*; a walking floor pressure gauge 174*c*; a total system pressure gauge 175*c*, which monitors the hydraulic pressure delivered by the hydraulic pump; a discharge auger pressure gauge 176*c*; a rotary shredder pressure gauge 177*c*; and a hydraulic ram pressure gauge 178*c*.

The controls panel 170 also includes a touch screen 210 operable to display various types of information to an operator and further operable to allow the operator to interact with the computer controller in various ways. The touch screen includes a number of regions 212, 214, 216, 218 that constitute interactive touch control buttons which, when touched, cause the computer controller to execute various tasks. The computer controller is programmed to display text and/or graphics in registration with one or more of the buttons to signify to the operator what operation will be carried out when each button is touched. For example, the touch screen can display a main menu (FIG. 15B) on which the button 212 displays the text "Maintenance Manual" (or alternatively displays a graphical icon); when the button 212 is touched on the main menu, the computer controller is caused to display on the touch screen a maintenance manual menu (FIG. 16) allowing the operator to bring up any of various maintenance manuals for the various systems of the mobile shredder; the maintenance manual is stored in a memory device (e.g., a hard disk drive or the like) connected with the computer controller. The maintenance manuals can include digital video clips illustrating various maintenance procedures, in addition to text (in searchable or non-searchable form). The maintenance manual menu can include various buttons or icons for different mobile shredder systems manuals, such as a truck manual icon, a shredder manual icon, a truck body manual icon, and the like.

The main menu of the touch screen can also display the text "Troubleshooting" or the like in registration with the button 214 such that when the button 214 is touched, the computer controller causes the touch screen to display a troubleshooting menu (FIG. 17) that draws on a knowledge base stored in the memory device connected to the controller so as to provide the operator with information to assist in determining possible causes for various malfunctions of the mobile shredder. The troubleshooting menu can include buttons or icons allowing the operator to display other pages such as an input/output (I/O) page (FIG. 18), an event history page (FIG. 20), a troubleshooting guide (not shown), and the like.

Figure 17:
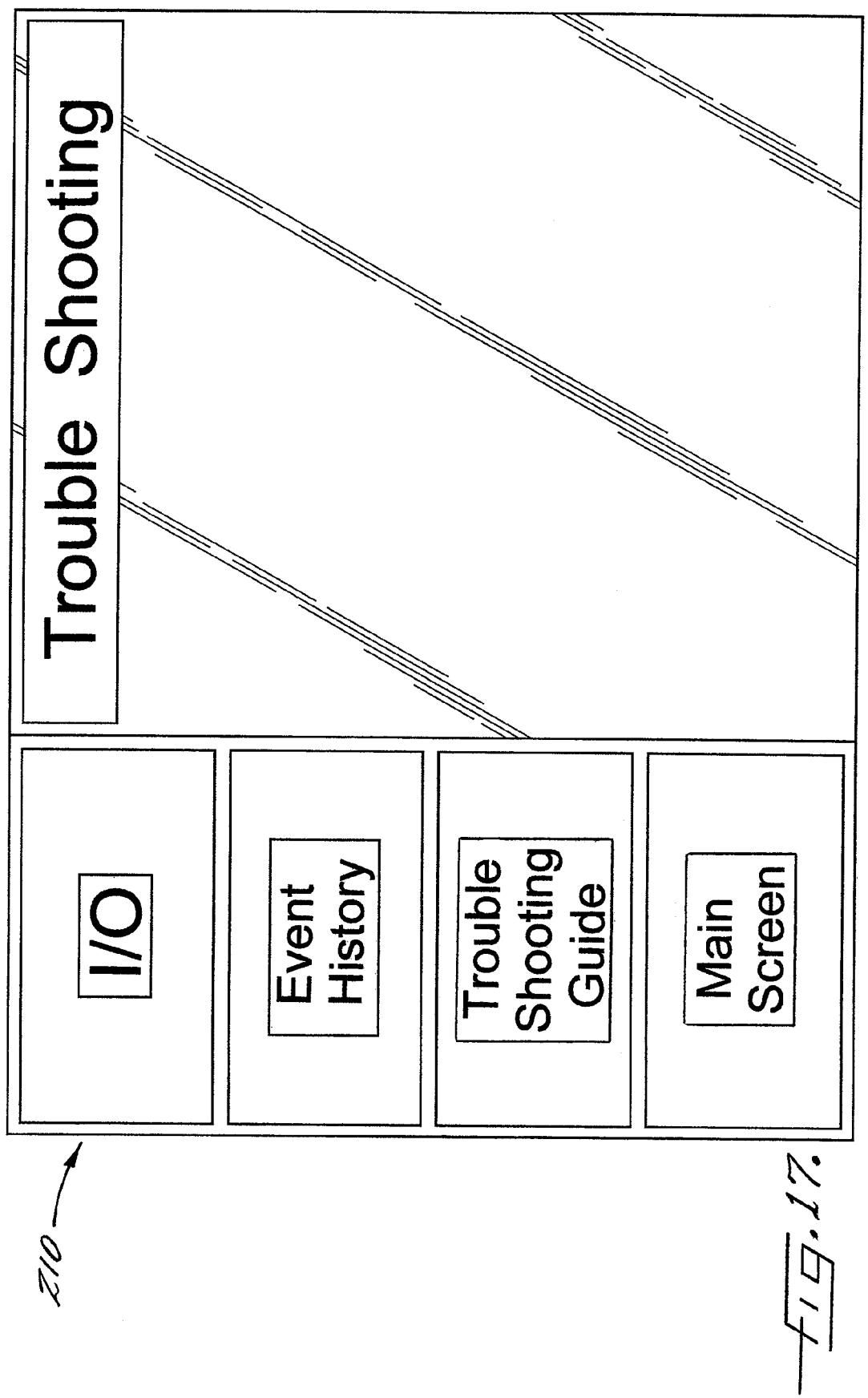
FIG. 17 depicts a main troubleshooting menu displayed on the touch screen when selected from the main menu of FIG. 15A/B.
Figure 21:
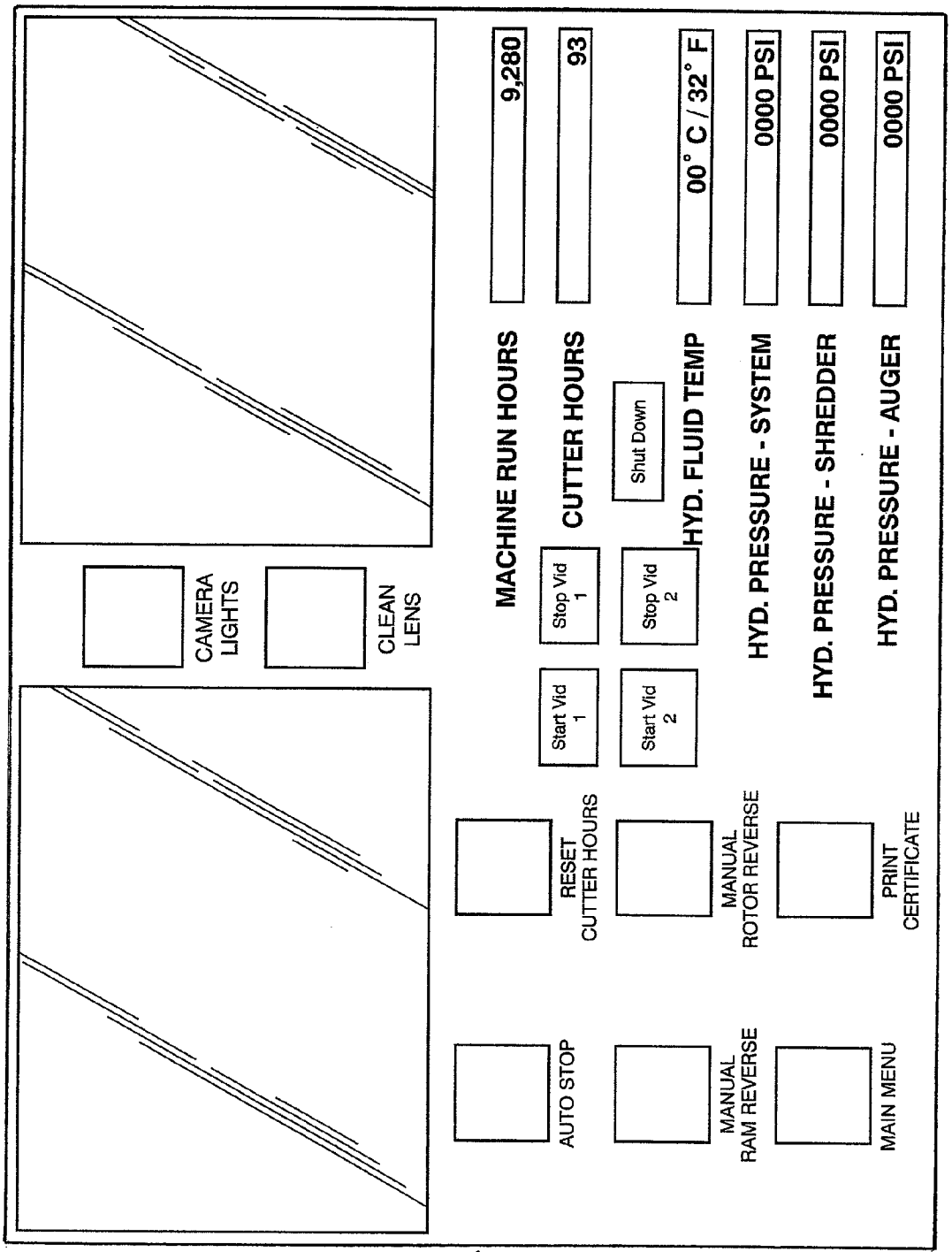
FIG. 21 shows a machine operation page displayed on the touch screen when selected from the main menu of FIG. 15A/B.

When the event history icon on the troubleshooting menu of FIG. 17 is selected, an event history page as shown in FIG. 20 is displayed on the touch screen 210. The event history page displays a list of all significant events in the history of the operation of the mobile shredder, as detected by various sensors and as recorded in a memory device connected with the computer controller, along with the date and time of each event. If any alarm was triggered, it is also recorded in the event history file stored in the memory device.

The main menu can further display the text "Job Setup" or the like in registration with the button 216 such that when the button 216 is touched, the computer controller causes the touch screen to display a job setup menu (FIG. 19) that allows the operator to select, add, delete, and edit various information regarding customers.

The main menu can also display the text "Machine Operation" or the like in registration with the button 218 so that when the button 218 is touched, the computer controller causes the touch screen to display a machine operation page (FIG. 21) that allows the operator to selectively view text and/or graphics and/or digital video of various aspects of operating the mobile shredder. The machine operation page also displays certain key operating parameters such as hydraulic fluid temperature, system hydraulic fluid pressure, shredder hydraulic fluid pressure, auger hydraulic fluid pressure, machine run hours, shredder or cutter hours, and the like. The machine operation page also includes icons allowing the operator to perform certain operations such as manual ram reversal, manual shredder rotor reversal, reset the cutter hours (e.g., after an overhaul), and printing of a certificate for a customer indicating how much material was shredded, the date and time of shredding, and other information.

System Alarms

The computer controller advantageously is programmed to detect, via suitable sensors connected to the controller, various abnormal conditions of the mobile shredder and to initiate different levels of alarm depending on the abnormal condition that is detected. The alarm system advantageously includes relatively low-level alarms for certain conditions and higher-lever alarms for other more-serious conditions. For example, in one embodiment of the invention, the controller is operable to provide a relatively low level of alarm when the sensor system indicates an abnormal condition of the rotary shredder 130 or associated components (shredder drive 137, hydraulic ram 135), and to provide a relatively higher level of alarm when the sensor system indicates an abnormal condition of the truck.

One type of abnormal truck condition that can generate an alarm is low fuel level. Thus, based on a fuel level sensor, the computer controller can cause a relatively low-level alarm to be given (e.g., by causing the truck's horn to sound intermittently at a relatively low frequency, such as once every 5 seconds) if the fuel level falls below a certain value (e.g., one-eighth of a tank). A higher level alarm (e.g., causing the horn to sound once every second) can be initiated if the fuel level falls to a dangerously low level (e.g., one-sixteenth of a tank). Alternatively or additionally, the controller can be operable to shut down the engine when the level of fuel falls below a predetermined level (e.g., one-sixteenth of a tank) so as to avoid running out of fuel; this is particularly advantageous for diesel engines wherein running out of fuel is a major event requiring re-priming of the engine to restart it. Other alarms can also be generated for other types of malfunctions, and any alarm states can be stored in the event history file, as previously noted, which can assist the operator or maintenance personnel in diagnosing and repairing the mobile shredder as needed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mobile shredder for shredding documents and other materials, comprising:
   a truck having a truck body defining an enclosure and including a partition in the enclosure that divides a storage volume from the remainder of the enclosure for storage of shredded material in said storage volume;
   a shredder mounted in the enclosure outside the storage volume and including cutters configured to shred material;

a discharge conveyer arranged to receive shredded material from the shredder and discharge the shredded material into the storage volume; and a live floor within the storage volume, the live floor comprising a plurality of axially extending parallel slats arranged in multiple groups each comprising a plurality of slats that alternate with slats of the other groups, and a drive system structured and arranged to alternately move all of the groups rearwardly in unison and then to sequentially move each group forwardly one at a time and to repeat such unison and sequential movements to move the shredded material out a rear end of the storage volume.

2. The mobile shredder of claim 1, further comprising an infeed system disposed for receiving material to be shredded.

3. The mobile shredder of claim 1, further comprising:
a hydraulic drive coupled to the shredder and operable to receive pressurized hydraulic fluid and drive the shredder; and
a hydraulic pump for pressurizing hydraulic fluid, the hydraulic pump being connected to the hydraulic drive of the shredder.

4. The mobile shredder of claim 3, wherein the truck comprises an engine including a drive train, and a power takeoff unit coupled between the drive train and the hydraulic pump for driving the hydraulic pump.

5. The mobile shredder of claim 4, further comprising a programmed controller operable to control operation of the hydraulic pump, and a sensor system in communication with the controller and operable to monitor a plurality of operating parameters of the shredder and truck, the controller being programmed to provide an alarm indication when one or more of the operating parameters is outside a predetermined normal range for said operating parameter.

6. The mobile shredder of claim 5, wherein the controller is operable to provide a relatively low level of alarm when the sensor system indicates an abnormal condition of the shredder or associated components, and to provide a relatively higher level of alarm when the sensor system indicates an abnormal condition of the truck.

7. The mobile shredder of claim 4, wherein the power takeoff unit is selectively engageable with and disengageable from the drive train, and further comprising a programmed controller operable to control operation of the hydraulic pump and to control engagement and disengagement of the power takeoff unit with the drive train.

8. The mobile shredder of claim 7, further comprising a pump sensor operable to measure a load level of the hydraulic pump, and wherein the controller is coupled with the pump sensor and is operable to prevent the hydraulic pump from being shut down when the load level measured by the pump sensor is above a predetermined limit.

9. The mobile shredder of claim 7, further comprising a transmission sensor operable to detect whether or not a transmission of the drive train is in a neutral gear, and wherein the controller is coupled with the transmission sensor and is operable to prevent the power takeoff unit from being engaged with the drive train unless the transmission is in a neutral gear.

10. The mobile shredder of claim 7, wherein the truck further comprises a parking brake that prevents rolling of the truck when set, and further comprising a brake sensor operable to detect whether or not the parking brake is set, the controller being coupled with the brake sensor and being operable to prevent the power takeoff unit from being engaged with the drive train unless the parking brake is set.

11. A mobile shredder for shredding documents and other materials, comprising:
a truck having a truck body defining an enclosure and including a partition in the enclosure that divides a storage volume from the remainder of the enclosure for storage of shredded material in said storage volume;
a rotary shredder mounted in the enclosure outside the storage volume, the rotary shredder comprising a rotor having cutters rigidly mounted thereon;
a bin lift and dump mechanism operable to transport material to be shredded from outside to inside the enclosure so as to deliver material to the rotary shredder;
a discharge conveyor operable to transport shredded material from the rotary shredder through the partition to the storage volume within the enclosure; and
a live floor within the storage volume, the live floor comprising a plurality of axially extending parallel slats arranged in multiple groups each comprising a plurality of slats that alternate with slats of the other groups, and a drive system structured and arranged to alternately move all of the groups rearwardly in unison and then to sequentially move each group forwardly one at a time and to repeat such unison and sequential movements to move the shredded material out a rear end of the storage volume.

12. The mobile shredder of claim 11, further comprising a controller operatively coupled to the live floor and to the discharge conveyor, the controller being operable to control compaction of the shredded material in the storage volume by alternately operating in a first mode wherein the discharge conveyor is operated and the live floor is stationary, and a second mode wherein the discharge conveyor is operated and the live floor is operated to carry shredded material away from the discharge conveyor.

13. The mobile shredder of claim 11, wherein said bin lift and dump mechanism further comprises a bin-engaging member structured and arranged to grasp a bin that contains material to be shredded, and a powered lift device coupled with the bin-engaging member and operable to lift the bin-engaging member from a first position generally vertically upward to a second position that places the bin in a generally upright orientation adjacent the rotary shredder, and operable then to move the bin-engaging member to a third position that tips the bin so as to dump the material to be shredded from the bin into the rotary shredder.

14. The mobile shredder of claim 13, further comprising a load sensor associated with the rotary shredder and operable to provide a signal indicative of a load level of the shredder, and wherein said bin lift and dump mechanism further comprises a controller operatively coupled with the load sensor and with the lift device of the lift and dump mechanism, the controller being operable to automatically operate the lift device through a cycle from the second position to the third position and then back to the second position, and being further operable to suspend the cycle to prevent the bin from being emptied into the rotary shredder when the load level indicated by the load sensor exceeds a predetermined limit and to resume the cycle to empty the bin into the rotary shredder when the load level falls below said predetermined limit.

15. The mobile shredder of claim 11, wherein said rotary shredder has an integral hopper and an integral feed ram for receiving material to be shredded and feeding the material toward the shredder.

* * * * *